(12) United States Patent
McMahon (10) Patent No.: US 8,608,111 B2
(45) Date of Patent: Dec. 17, 2013

(54) DECOUPLING MECHANISM FOR A STORE

(75) Inventor: Roy P. McMahon, Indianapolis, IN (US)

(73) Assignee: Raytheon Company, Waltham, MA (US)

( * ) Notice: Subject to any disclaimer, the term of this patent is extended or adjusted under 35 U.S.C. 154(b) by 431 days.

(21) Appl. No.: 13/078,141

(22) Filed: Apr. 1, 2011

(65) Prior Publication Data

US 2011/0240799 A1 Oct. 6, 2011

Related U.S. Application Data

(60) Provisional application No. 61/320,075, filed on Apr. 1, 2010.

(51) Int. Cl.
*B64D 1/12* (2006.01)

(52) U.S. Cl.
USPC ........................................ 244/137.4; 89/1.54

(58) Field of Classification Search
USPC ..................... 244/137.4, 137.1; 89/1.54, 1.59
See application file for complete search history.

(56) References Cited

U.S. PATENT DOCUMENTS

| | | | |
|---|---|---|---|
| 2,347,369 A | 4/1944 | Roters | |
| 2,369,638 A | 2/1945 | Baker et al. | |
| 2,451,481 A | 10/1948 | Elder et al. | |
| 2,469,363 A * | 5/1949 | Biondi | 89/1.54 |
| 2,509,521 A | 5/1950 | Pegram | |
| 4,543,873 A | 10/1985 | Stock | |
| 5,593,224 A | 1/1997 | Kunkel et al. | |
| 5,717,397 A | 2/1998 | Ruszkowski, Jr. | |
| 5,932,829 A * | 8/1999 | Jakubowski, Jr. | 89/1.54 |
| 6,347,768 B1 * | 2/2002 | Jakubowski et al. | 244/137.4 |
| 6,481,669 B1 * | 11/2002 | Griffin | 244/137.4 |
| 6,811,123 B1 * | 11/2004 | Foster et al. | 244/137.4 |
| 7,007,895 B2 * | 3/2006 | Jakubowski et al. | 244/137.4 |
| 7,083,148 B2 * | 8/2006 | Bajuyo et al. | 244/137.4 |
| 7,610,841 B2 | 11/2009 | Padan | |
| 7,966,921 B1 * | 6/2011 | Alday | 89/1.53 |
| 2005/0183570 A1 | 8/2005 | McMahon | |
| 2005/0204910 A1 | 9/2005 | Padan | |
| 2006/0283315 A1 * | 12/2006 | Blackburn | 89/1.54 |
| 2012/0291613 A1 * | 11/2012 | Rastegar | 89/1.54 |

* cited by examiner

*Primary Examiner* — Christopher P Ellis
(74) *Attorney, Agent, or Firm* — Thorpe North & Western LLP (57) ABSTRACT

According to one embodiment, an aircraft pylon system comprises a pylon, a bail bar located within the pylon, an offset bracket assembly, and a lanyard release assembly. The offset bracket assembly comprises an elongated member configured to be placed around the bail bar within the pylon, a bracket coupled to the elongated member, and a lanyard-engaging member coupled to the bracket and offset from a longitudinal axis of the elongated member. The lanyard release assembly comprises a lanyard coupled to the lanyard-engaging member and a lanyard release connector coupled to the lanyard and releasably coupled to the store.

20 Claims, 11 Drawing Sheets

DECOUPLING MECHANISM FOR A STORE

RELATED APPLICATIONS

This application claims priority to U.S. Patent Application Ser. No. 61/320,075, entitled "CONNECTOR DECOUPLING MECHANISM FOR A STORE," which was filed on Apr. 1, 2010.

TECHNICAL FIELD OF THE DISCLOSURE

This disclosure generally relates to pylon stores, and more particularly, to a decoupling mechanism for a store.

BACKGROUND OF THE DISCLOSURE

Modern military aircraft are typically configured with stores, such as bombs or missiles for armament. These stores may be used by the aircraft to disable or incapacitate known threats in a theater of battle. In many cases, stores may be configured within or underneath the fuselage or wings of the aircraft and ejected or jettisoned at a precise moment to strike their intended target. Smart bombs are a particular type of military store that includes processing circuits for guidance and/or triggering.

SUMMARY OF THE DISCLOSURE

According to one embodiment, an aircraft pylon system comprises a pylon, a bail bar located within the pylon, an offset bracket assembly, and a lanyard release assembly. The offset bracket assembly comprises an elongated member configured to be placed around the bail bar within the pylon, a bracket coupled to the elongated member, and a lanyard-engaging member coupled to the bracket and offset from a longitudinal axis of the elongated member. The lanyard release assembly comprises a lanyard coupled to the lanyard-engaging member and a lanyard release connector coupled to the lanyard and releasably coupled to the store.

Some embodiments may provide numerous technical advantages. For example, a technical advantage of one embodiment may include enhanced reliability of lanyard release connectors that are used with pylons having bail bars whose axis is not aligned with the store. A technical advantage of one embodiment may also include reduced failure of lanyard release connectors. A technical advantage of one embodiment may also include improved release of a store without permanently modifying the pylon.

Various embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

It should be understood at the outset that, although example implementations of embodiments are illustrated below, various embodiments may be implemented using a number of techniques, whether currently known or not. The present disclosure should in no way be limited to the example implementations, drawings, and techniques illustrated below An aircraft may be configured to carry any suitable payload, such as a store. A store may include any device for internal or external carriage, which includes items to be released from an aircraft. Aircraft stores may include both expendable stores and nonexpendable stores. Expendable stores may include any aircraft store normally separated from the aircraft in flight, including, but not limited to, a missile, rocket, bomb, nuclear weapon, mine, torpedo, pyrotechnic device, sonobuoy, and signal underwater sound device. Nonexpendable stores may include any aircraft store which is not normally separated from the aircraft in flight, including, but not limited to, a tank (fuel and spray), line-source disseminator, pod (refueling, thrust augmentation, gun, electronic attack, data link, etc.), multiple rack, target, cargo drop container, and drone.

One example of a store is a smart bomb. A smart bomb is a precision-guided munition intended to hit a specific target precisely. A smart bomb may use onboard guidance systems that direct the smart bomb's movement during its fall towards an intended target. These guidance systems and other processing systems may be electrically coupled to processing systems configured on the aircraft using a wiring harness, sometimes known as an umbilical cable.

Figure 1A:
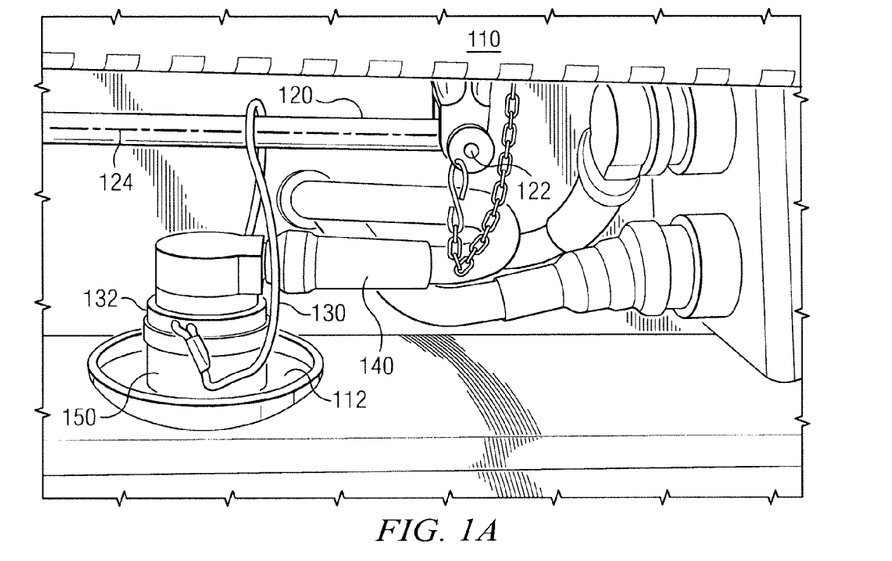
FIG. 1A shows a side cutaway view of an aircraft pylon system.
Figure 1B:
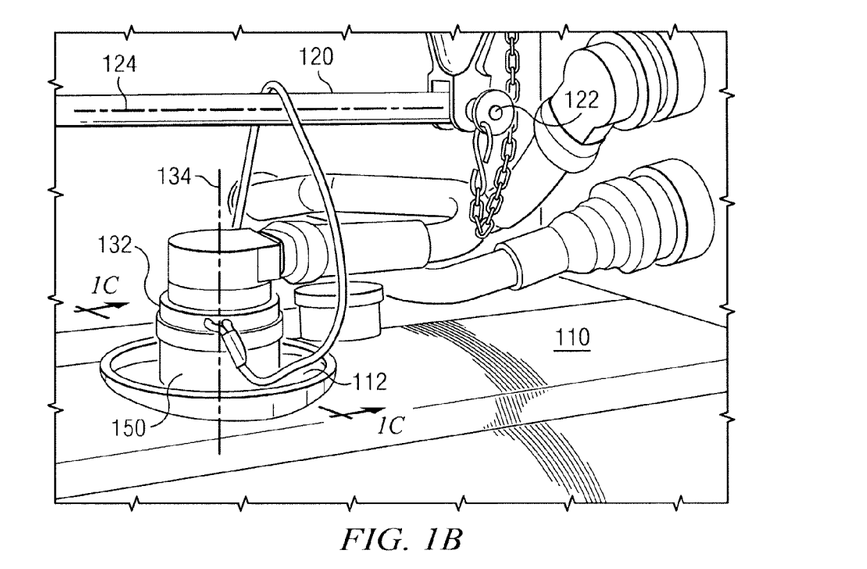
FIG. 1B shows a perspective cutaway view of the aircraft pylon system of FIG. 1A.
Figure 1C:
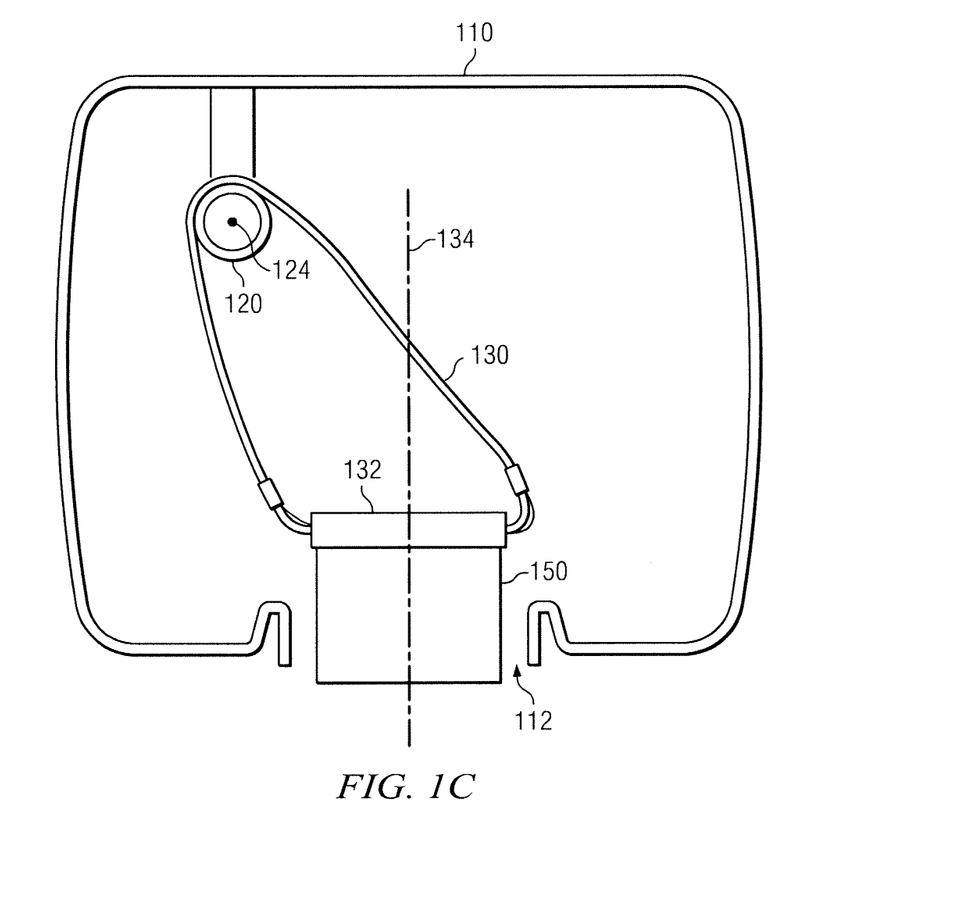
FIG. 1C shows a cross-sectional view of the aircraft pylon system 100 of FIG. 1B.

FIGS. 1A, 1B, and 1C show an aircraft pylon system 100 according to one embodiment. FIG. 1A shows a side cutaway view of an aircraft pylon system 100. FIG. 1B shows a perspective cutaway view of the aircraft pylon system 100 of FIG. 1A. FIG. 1C shows a cross-sectional view of aircraft pylon system 100 taken along the C-C line of FIG. 1B.

In this example, aircraft pylon system 100 includes a pylon 110 containing a bail bar 120, a lanyard 130, a lanyard release connector 132, a wiring harness 140, and a store 150.

Pylon 110 may include any part of an airframe designed to carry payload. Pylon 110 may be made from any suitable material, such as aluminum, steel, or other metal. In some examples, pylon 110 also includes an opening 112 through which store 150 may be released.

Bail bar 120 may include any structure that allows for lanyard 130 to be secured to pylon 110. In this example, bail bar 120 is an elongated bar releasably coupled to the pylon by a bail bar pin 122. By releasing bail bar pin 122, bail bar 120 may become partially or completely disassociated with pylon 110 such that lanyard 130 may slide around bail bar 120. Bail bar 120 and bail bar pin 122 may be made from any suitable material, including, but not limited to, aluminum, steel, or other metal.

Lanyard 130 may include any device for coupling lanyard 130 to pylon 110. In the illustrated example, lanyard 130 couples lanyard release connector 132 to bail bar 120, and lanyard release connector 132 is releasably coupled to store 150. In one embodiment, lanyard release connector 132 is a type of connector conforming to a military standard 1760 (MIL-STD-1760) specification, such as a connector having a D38999/31 series part number. Lanyard release connectors conforming to this specification typically include a lanyard 130 for relatively quick removal from its complementary connector using a pulling force on lanyard 130.

Wiring harness 140 may include any device for electrically coupling store 150 to the aircraft. In the illustrated example, wiring harness 140 connects to lanyard release connector 132. In this example, wiring harness 140 may facilitate electronic communication between guidance systems and processing systems associated with store 150 and processing systems configured on the aircraft.

In this example, longitudinal axis 124 is situated through the length of bail bar 120, and central axis 134 is situated through lanyard release connector 132. As shown in FIG. 1C, longitudinal axis 124 of bail bar 120 is offset from central axis 134 of lanyard release connector 132 such that longitudinal axis 124 and central axis 134 are not aligned.

Figure 1D:
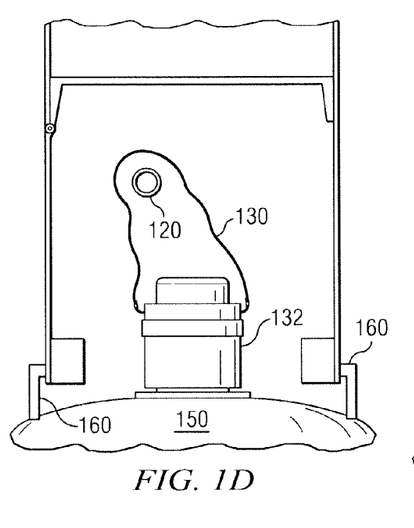
FIGS. 1D, 1E, and 1F show progressive views of a lanyard release connector that is pulled from a store that is not aligned with the bail bar in the aircraft pylon system of FIG. 1A.
Figure 1E:
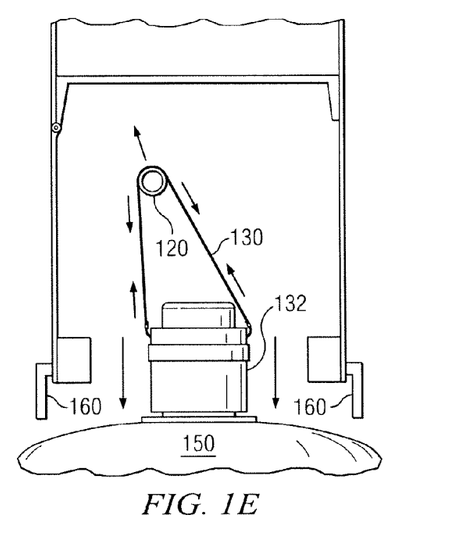
Figure 1F:
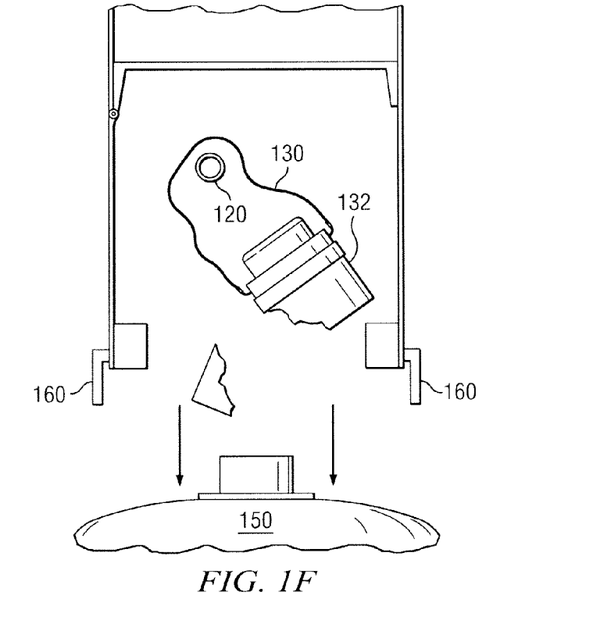

In some situations, misalignment of longitudinal axis 124 and central axis 134 may cause lanyard release connector 132 to fail due to lateral forces exerted by lanyard 130 during release of store 150. For example, FIGS. 1D, 1E, and 1F show progressive views of a lanyard release connector 132 that is pulled from a store 150 that is not aligned with bail bar 120. FIG. 1D shows aircraft pylon system 100 prior to release of store 150, FIG. 1E shows aircraft pylon system 100 during release of store 150, and FIG. 1F shows aircraft pylon system after release of store 150.

In FIG. 1D, store 150 is positioned relative to bail bar 120 such that lanyard 130 includes some slack. In some embodiments, store rack 160 may couple store 150 to pylon 110 prior to release of store 150. Store rack 160 may provide physical support for store 150 during transit such that lanyard 130 is not responsible for carrying the weight of store 150. One example of store rack 160 may include a bombrack that may be bolted or otherwise coupled to pylon 110.

In some embodiments, store rack 160 may also be responsible for release of store 150 from pylon 110. For example, in FIG. 1E, store rack 160 releases store 150, resulting in store 150 falling away from pylon 110 imparting force on lanyard 130 when the slack in lanyard 130 is removed. The lateral forces imparted onto lanyard 130 may cause lanyard 132 to disconnect from store 150 as store 150 falls away from pylon 110.

As can be seen in FIG. 1F, lateral forces imparted into lanyard release connector 132 may exert undue strain upon the lanyard release connector 132 such that lanyard 130, lanyard release connector 132, and/or store 150 may break or become weakened during ejection of store 150 from pylon 110. Accordingly, teachings of certain embodiments recognize the capability to improve reliability of release connectors that are used with pylons having bail bars whose axis is not aligned with the store.

One example of an aircraft with pylons is the F-18 Hornet military aircraft manufactured by The Boeing Company located in Chicago, Ill. Pylons configured with the F-18 Hornet military aircraft typically include bail bars that are not aligned over the central axis 134 of its lanyard release connector 132. Thus, lanyard release connectors 132 configured on these pylons may experience reliability problems due to undue lateral stressed placed upon them during ejection of stores. Certain embodiments may therefore provide enhanced reliability for lanyard release connectors configured on pylons of F-18 military aircraft.

In addition, in some cases lanyard 130 may be free to slide along bail bar 120 during flight, as shown in FIG. 1B. Allowing lanyard 130 to slide away from central axis 134 may result in additional lateral forces on lanyard release connector 132. Accordingly, teachings of certain embodiments provide the capability to prevent lanyard 130 from sliding along bail bar 120.

Figure 2A:
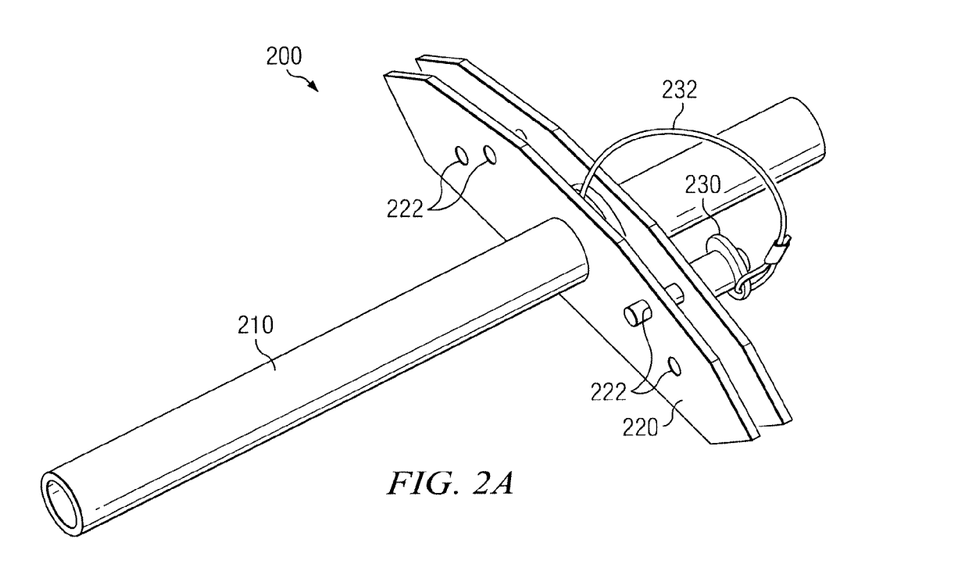
FIG. 2A shows a front perspective view of an offset bracket assembly.
Figure 2B:
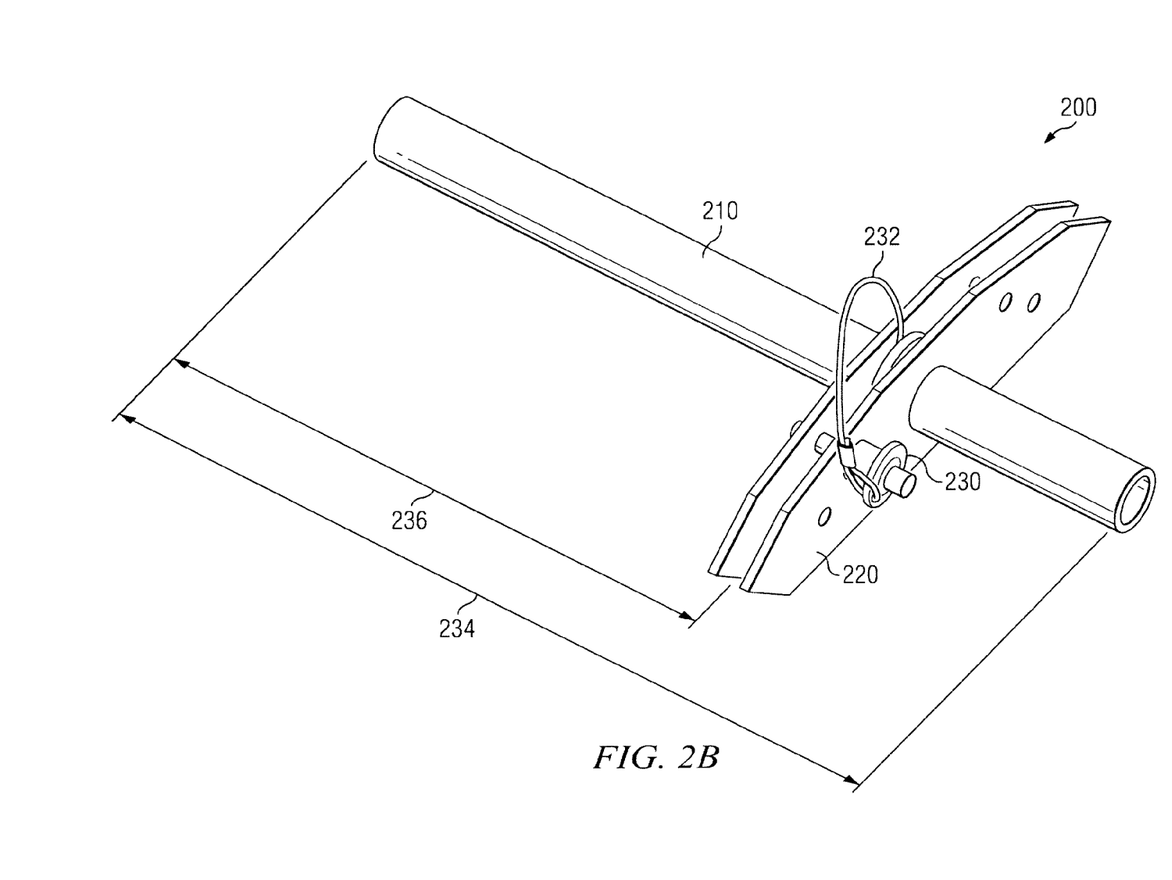
FIG. 2B shows a rear perspective view of the offset bracket assembly of FIG. 2A.
Figure 2C:
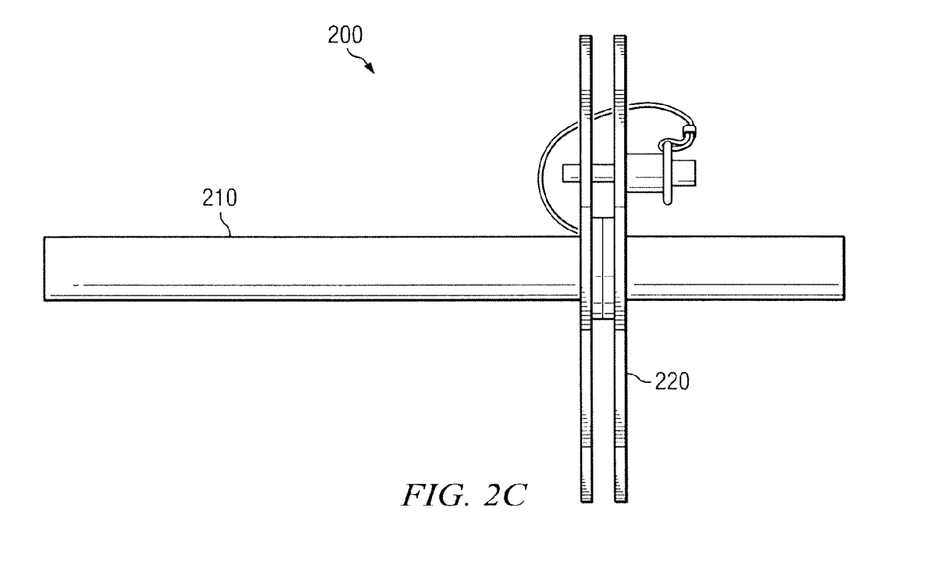
FIG. 2C shows a top view of the offset bracket assembly of FIG. 2A.

FIGS. 2A, 2B, and 2C show an offset bracket assembly 200 according to one embodiment. FIG. 2A shows a front perspective view of offset bracket assembly 200. FIG. 2B shows a rear perspective view of offset bracket assembly 200 of FIG. 2A. FIG. 2C shows a top view of offset bracket assembly of FIG. 2A. Offset bracket assembly 200 includes an elongated member 210, a bracket 220, and a lanyard-engaging member 230.

Elongated member 210 may include any structure that may be situated around bail bar 120. In one embodiment, elongated member 210 comprises a hollow bar having an inner diameter of sufficient size to be slid over bail bar 120. Elongated member 210 may be formed of any suitable material, including, but not limited to, aluminum, steel, or other metal.

Bracket 220 may include any structure for coupling lanyard-engaging member 230 to elongated member 210. In one embodiment, bracket 220 is formed from a piece of sheet metal that may be mounted to, or otherwise attached to, elongated member 210. In another embodiment, bracket 220 comprises two parallel plates, each of which is attached to elongated member 210. Bracket 220 may be attached to elongated member 210 using any suitable technique, including, but not limited to, welding.

Lanyard-engaging member 230 may include any device for coupling lanyard 130 to bracket 220. In one embodiment, lanyard-engaging member 230 comprises a locking pin that is selectively inserted into holes 222 configured in bracket 220. In one example, the locking pin may engage lanyard 130 by its removal from holes 222, placing lanyard 130 in the space between the two sheets of material of bracket 220, and replacing the locking pin in holes 222 such that lanyard 130 is entrapped between the two sheet of material and the locking pin. In some embodiments, a pin lanyard 232 may also be provided to ensure that the locking pin is not misplaced from offset bracket assembly 200.

In some embodiments, bracket 220 may include multiple holes 222 placed in various locations along bracket 220. Teachings of certain embodiments recognize the capability to select at least one hole of the multiple holes 222 such that lanyard-engaging member 230 will be most-closely aligned over lanyard release connector 132 and/or store 150.

As shown in FIG. 2B, elongated member 210 has an overall length 234, and bracket 220 is configured on elongated member 210 at a fixed offset length 236 from one end. Teachings of certain embodiments recognize that having a bracket 220 with a predetermined offset length may allow lanyard 130 to be maintained relatively closer to central axis 134 of lanyard release connector 132 than would be provided by bail bar 120. When lanyard 130 is placed over a bail bar 120 without offset bracket assembly 200, lanyard 130 may slide along the extent of bail bar 120 such that a lateral pulling force may be imparted onto lanyard release connector 132 during ejection of store 150. Offset bracket assembly 200 may provide a solution to this problem by placing the contact point of lanyard 130 on or near central axis 134 of lanyard release connector 132.

In some embodiments, the overall length 234 may be selected according to the length of bail bar 120 such that elongated member 210 does not slide excessively when bail bar 220 is inserted into its native position. The offset length 236 may be selected according to the position of store 150 relative to pylon 110 such that lanyard-engaging member 230 is positioned at or close to the central axis 134 of lanyard release connector 132. In one embodiment, the offset length 236 may be selected such that two stores 150 with differing connector positions relative pylon 110 may be used. For example, elongated member 210 may be configured on bail bar 120 such that the offset length 236 is on its rearward portion for one type of store 150, such as a Joint Direct Attack Munition. Conversely, elongated member 210 may be configured on bail bar 120 such that the offset length 236 is on its forward portion for another type of store 150, such as a Joint Stand-Off Weapon.

Figure 3A:
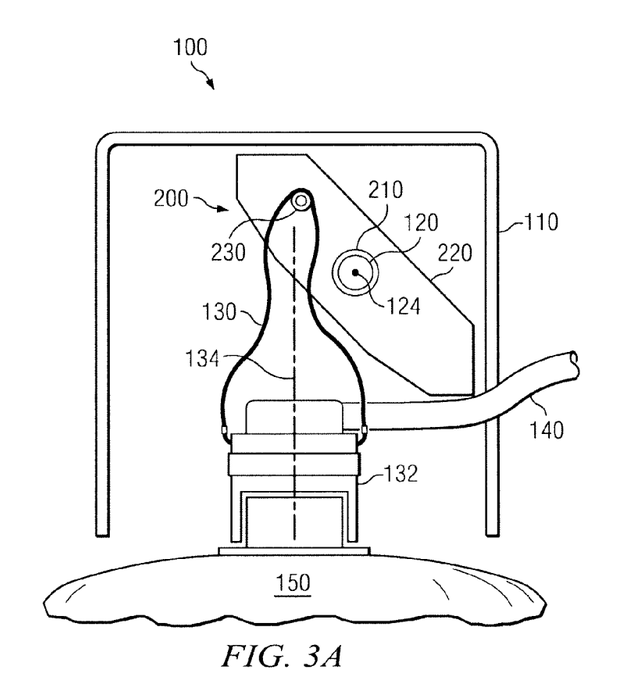
FIG. 3A shows a cross-sectional view of the offset bracket assembly of FIG. 2A installed in the aircraft pylon system of FIG. 1A.
Figure 3B:
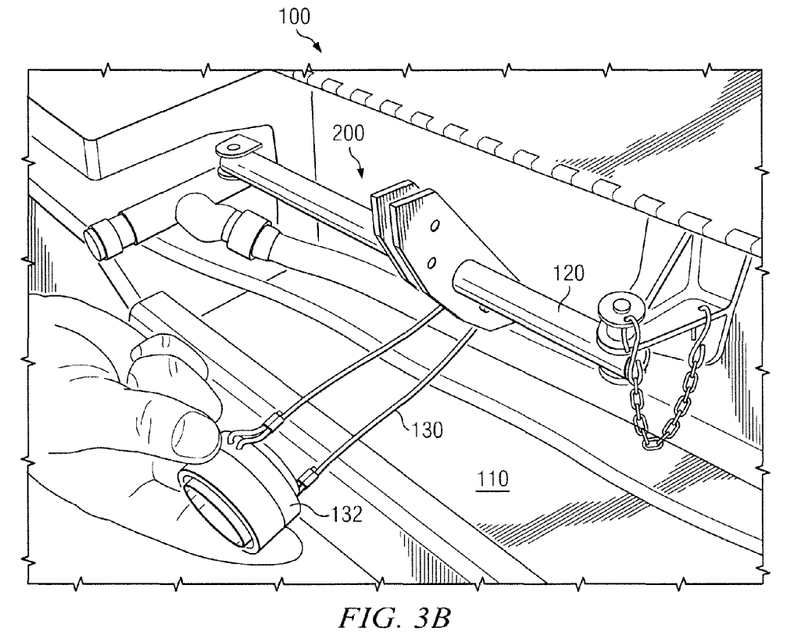
FIG. 3B shows a perspective view of the offset bracket assembly of FIG. 2A installed in the aircraft pylon system of FIG. 1A in a forward position.
Figure 3C:
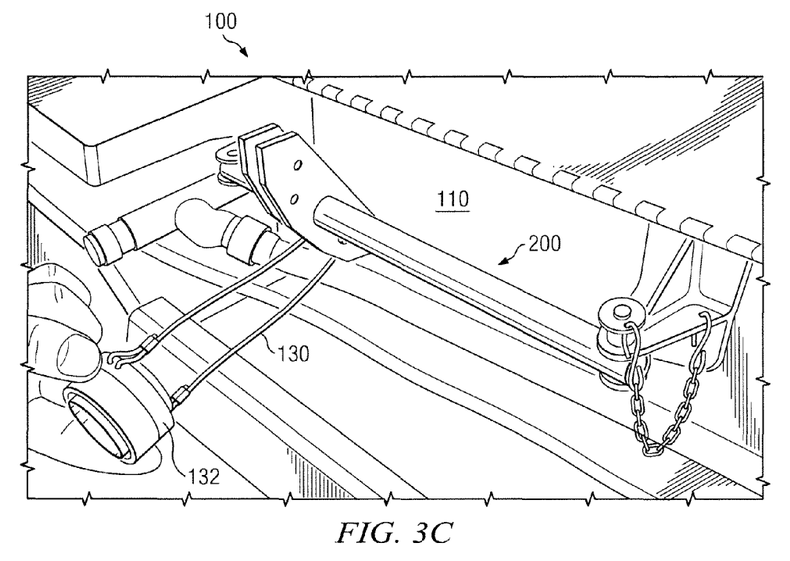
FIG. 3C shows a perspective view of the offset bracket assembly of FIG. 2A installed in the aircraft pylon system of FIG. 1A in an aft position.

FIGS. 3A, 3B, and 3C show offset bracket assembly 200 installed in aircraft pylon system 100 according to one embodiment. FIG. 3A shows a cross-sectional view of offset bracket assembly 200 with store 150 installed in aircraft pylon system 100 according to one embodiment. FIG. 3B shows a perspective view of offset bracket assembly 200 installed in aircraft pylon system 100 in a forward position with store 150 removed according to one embodiment. FIG. 3C shows a perspective view of offset bracket assembly 200 installed in aircraft pylon system 100 in an aft position with store 150 removed according to one embodiment.

As shown in FIG. 3A, the ends of bracket 220 abut interior surfaces of pylon 110. In various embodiments, one or both ends of bracket 220 abut interior surfaces of pylon 110. Teachings of certain embodiments recognize that allowing at least one end of bracket 220 to abut an interior surface of pylon 110 may allow forces imparted onto lanyard-engaging member 230 during ejection of store 150 to be displaced to an interior surface of pylon 110, such as a wall or ceiling of pylon 110. In addition, in some embodiments, forces imparted onto lanyard-engaging member 230 during ejection of a store may also be displaced through bail bar 120 to pylon 110.

FIGS. 4A, 4B, 4C, and 4D show offset bracket assembly 200 with feet 240 according to two additional embodiments. Teachings of certain embodiments recognize that feet 240 may spread the forces imparted by bracket 220 over a relatively wider region of pylon 110 when lanyard release connector 132 is pulled from store 150.

Figures 4A, 4B:
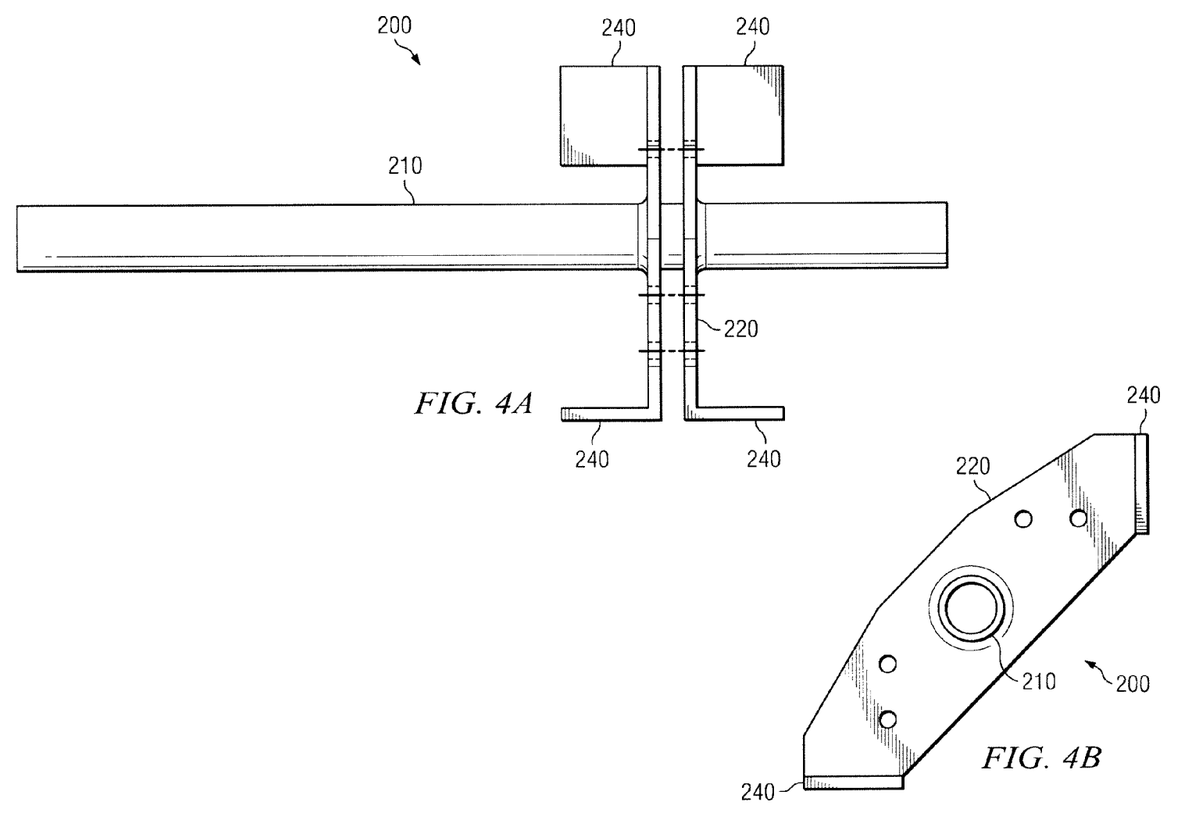
FIG. 4A shows a top view of the offset bracket assembly of FIG. 2A with four feet.
FIG. 4B shows a top view of the offset bracket assembly shown in FIG. 4A.

FIG. 4A shows a top view of offset bracket assembly 200 with four feet 240. FIG. 4B shows a top view of the offset bracket assembly 200 with four feet 240 shown in FIG. 4A. In FIGS. 4A and 4B, offset bracket assembly 200 comprises two pairs of feet 240 attached at opposite ends of bracket 220.

Figures 4C, 4D:
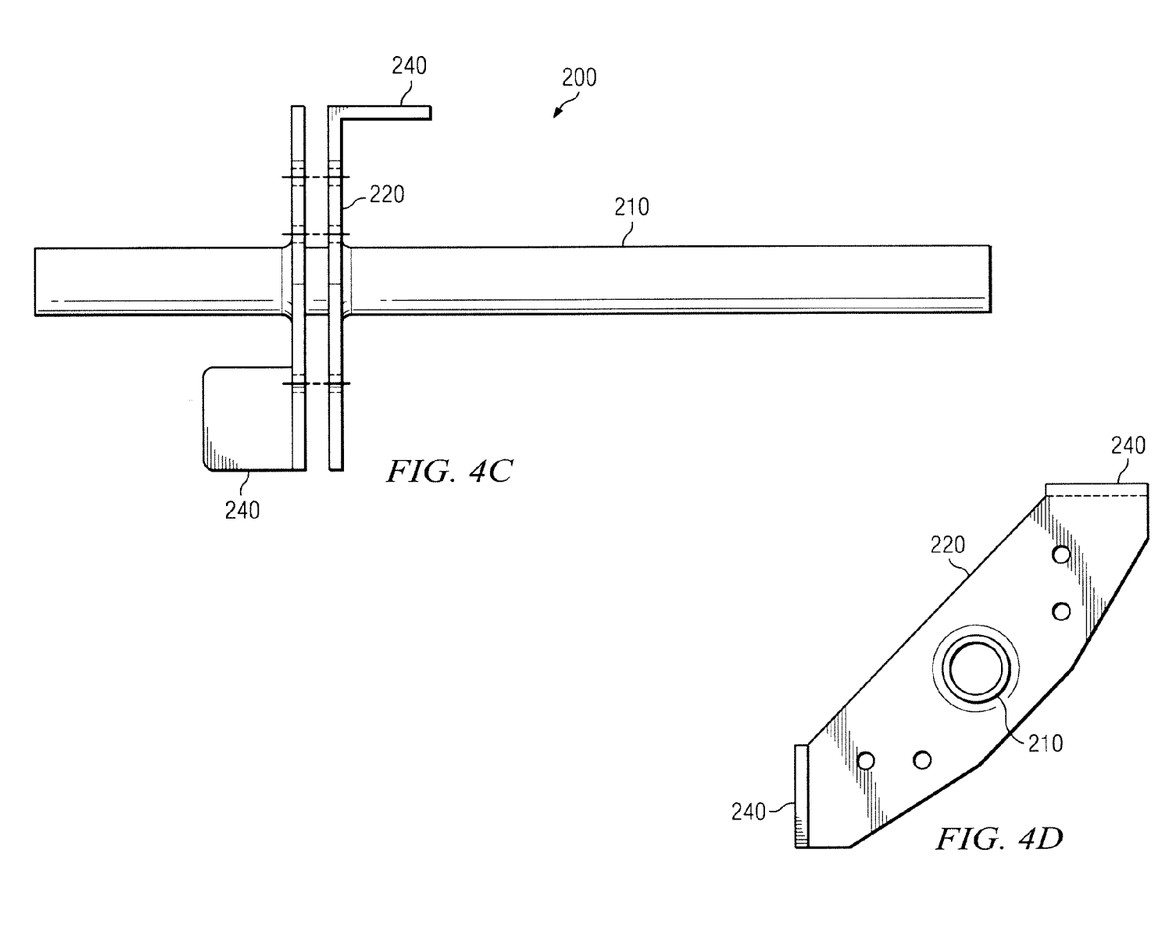
FIG. 4C shows a top view of the offset bracket assembly of FIG. 2A with two feet 240.
FIG. 4D shows a top view of the offset bracket assembly shown in FIG. 4C.

FIG. 4C shows a top view of offset bracket assembly 200 with two feet 240. FIG. 4D shows a top view of the offset bracket assembly 200 two feet 240 shown in FIG. 4C. In FIGS. 4C and 4D, offset bracket assembly 200 comprises one foot attached to each opposite end of bracket 220. In this example, bracket 220 comprises parallel plates, with each foot 240 being attached to a different plate.

Teachings of certain embodiments recognize that feet 240 may spread forces imparted by bracket 220 over a region of pylon 110 more efficiently if flat surfaces of feet 240 flushly abut pylon 110. However, teachings of certain embodiments also recognize that some or all feet 240 may not necessarily flushly abut pylon 110.

Figure 5A:
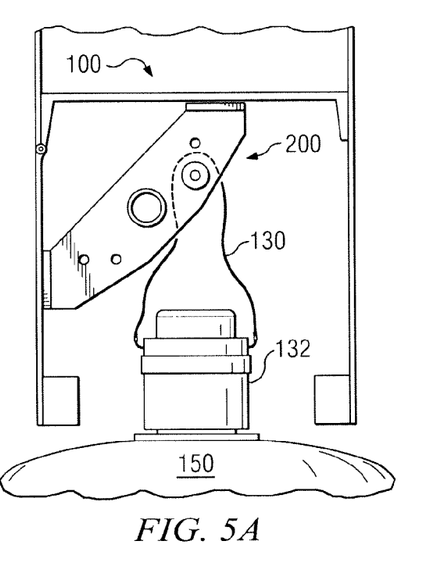
FIGS. 5A, 5B, and 5C show progressive views of a lanyard release connector that is pulled from a store using the offset bracket assembly of FIG. 2A installed in the aircraft pylon system of FIG. 1A according to one embodiment.
Figure 5B:
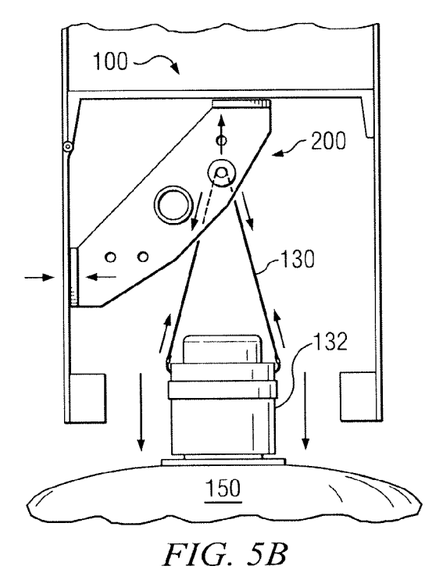
Figure 5C:
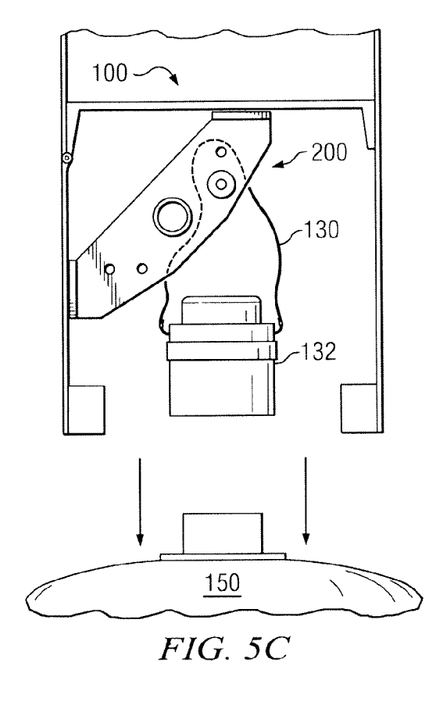

FIGS. 5A, 5B, and 5C show progressive views of a lanyard release connector 132 that is pulled from store 150 using offset bracket assembly 200. As shown in this example, lanyard-engaging member 132 maintains lanyard 130 at or near the central axis 134 of lanyard release connector 132 such that lateral forces imparted into lanyard release connector 132 are reduced during separation from store 150.

Figure 6A:
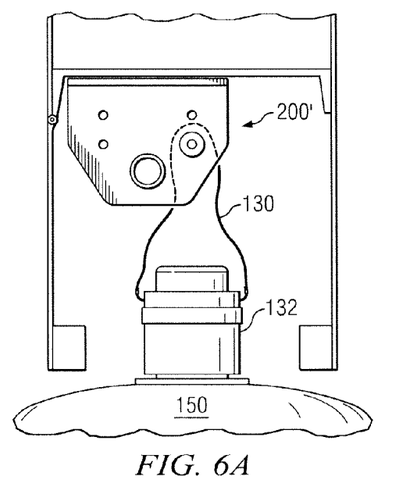
FIGS. 6A, 6B, and 6C show progressive views of a lanyard release connector that is pulled from a store using the offset bracket assembly of FIG. 2A installed in the aircraft pylon system of FIG. 1A according to one alternative embodiment.
Figure 6B:
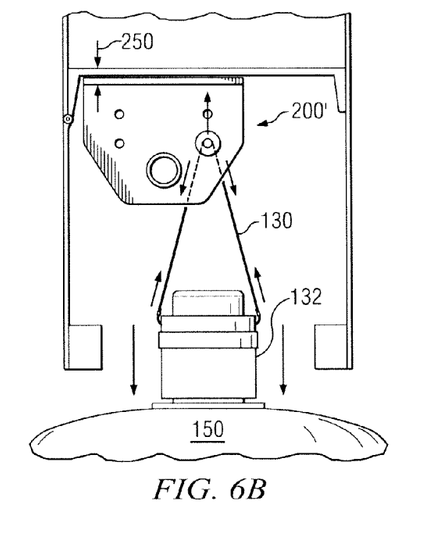
Figure 6C:
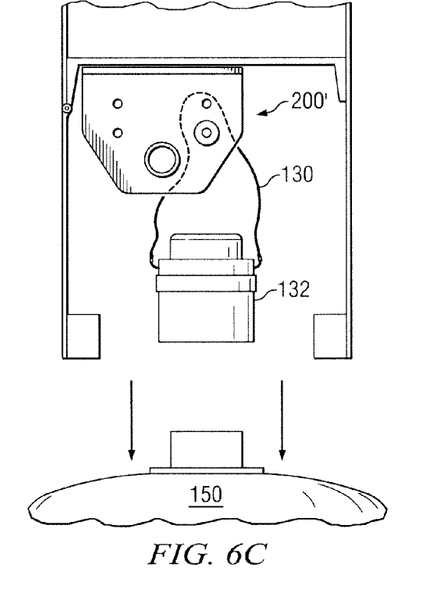

FIGS. 6A, 6B, and 6C show progressive views of a lanyard release connector 132 that is pulled from store 150 using offset bracket assembly 200'. Offset bracket assembly 200' differs from offset bracket assembly 200 in that it is formed in a manner to embrace upper surface of pylon 110 rather than embrace both an upper and side surface of pylon 110. With this configuration, offset bracket assembly 200' transfers lateral forces of lanyard release connector 132 to the upper surface of pylon 110 at a pressure point 250 opposite lanyard-engaging member 230.

Figure 7:
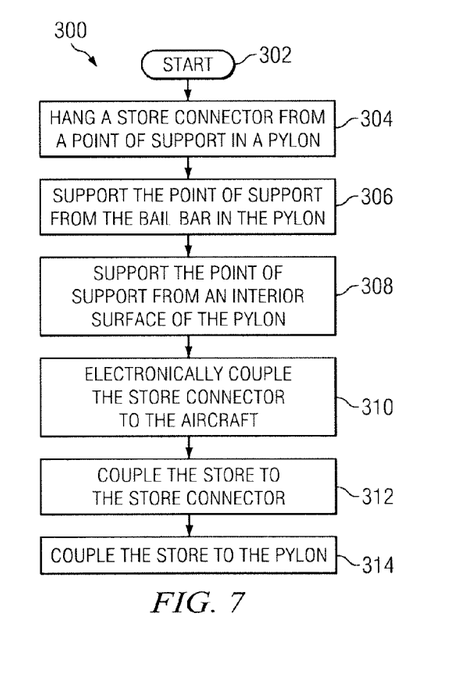
FIG. 7 shows a method for securing a store connector for a store to an aircraft according to one embodiment.

FIG. 7 shows a method 300 for securing a store connector for a store to an aircraft according to one embodiment. Method 300 starts with step 302. As part of step 302, an aircraft pylon may be identified. One example of an aircraft pylon may include pylon 110. The aircraft pylon may have an opening through which a store may be released. One example of an opening may include opening 12, and one example of a store may include store 150. The aircraft pylon may also have a bail bar located within the pylon. One example of a bail bar may include bail bar 120.

At step 304, the store connector is hung from a point of support. In some embodiments, the point of support is generally aligned with a central axis of the opening in the pylon. One example of a store connector is lanyard release connector 132. In one example embodiment, lanyard-engaging member 230 provides a point of support, and a lanyard such as lanyard 130 is hung from lanyard-engaging member 230. In this example embodiment, lanyard 130 may include lanyard release connector 132, which may connect to the store.

At step 306, support for the point of support is provided from the bail bar. For example, in one embodiment, the point of support is coupled to the bail by a bracket, such as bracket 220. At step 308, support for the point of support is provided from an interior surface of the pylon. For example, in one embodiment, the point of support is coupled to a bracket that abuts at least one interior surface of the pylon. At step 310, the store connector is electronically coupled to the aircraft. For example, in one embodiment, wiring harness 140 electronically couples the store connector to the aircraft.

At step 312, the store is connected to the store connector. At step 314, the store is coupled to the pylon such that the point of support does not carry the weight of the store prior to release of the store. For example, in one embodiment, store rack 160 couples store 150 to pylon 110 while the aircraft is in transit before store 150 is released.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

What is claimed is:

1. An aircraft pylon system, comprising:
   a pylon;
   a bail bar located within the pylon;
   an offset bracket assembly comprising:
      an elongated member configured to be placed around the bail bar within the pylon,
      a bracket coupled to the elongated member, and
      a lanyard-engaging member coupled to the bracket and offset from a longitudinal axis of the elongated member; and
   a lanyard release assembly comprising:
      a lanyard coupled to the lanyard-engaging member, and
      a lanyard release connector coupled to the lanyard and releasably coupled to a store.

2. The aircraft pylon system of claim 1, wherein the lanyard-engaging member is offset from the longitudinal axis of the elongated member such that the lanyard-engaging member is aligned with a central axis of the lanyard release connector.

3. The aircraft pylon system of claim 1, wherein the bracket is substantially perpendicular to the elongated member.

4. The aircraft pylon system of claim 1, further comprising a wiring harness electrically coupling the lanyard release connector to an aircraft.

5. The aircraft pylon system of claim 1, wherein the lanyard-engaging member comprises a pin releasably coupled to the bracket.

6. The aircraft pylon system of claim 1, wherein:
   the bracket comprises two parallel plates;
   each of the two parallel plates is coupled to the elongated member; and
   the lanyard-engaging member is coupled to and between the two parallel plates.

7. The aircraft pylon system of claim 1, wherein the at least one end of the bracket abuts an interior surface of the pylon.

8. An offset bracket assembly for use in an aircraft pylon having a bail bar, comprising:
   an elongated member configured to be placed around the bail bar within the aircraft pylon,
   a bracket coupled to the elongated member, and
   a lanyard-engaging member coupled to the bracket and offset from a longitudinal axis of the elongated member, the lanyard-engaging member being operable to couple to a lanyard release assembly configured to releasably couple a store to the lanyard-engaging member.

9. The offset bracket assembly of claim 8, wherein the lanyard release assembly comprises:
   a lanyard coupled to the lanyard-engaging member, and
   a lanyard release connector coupled to the lanyard and releasably coupled to the store.

10. The offset bracket assembly of claim 9, wherein the lanyard-engaging member is offset from the longitudinal axis of the elongated member such that the lanyard-engaging member is configured to be aligned with a central axis of the lanyard release connector.

11. The offset bracket assembly of claim 8, wherein the bracket is substantially perpendicular to the elongated member.

12. The offset bracket assembly of claim 8, wherein the lanyard-engaging member comprises a pin releasably coupled to the bracket.

13. The offset bracket assembly of claim 8, wherein:
   the bracket comprises two parallel plates;
   each of the two parallel plates is coupled to the elongated member; and
   the lanyard-engaging member is coupled to and between the two parallel plates.

14. The offset bracket assembly of claim 8, wherein the bracket has a length sized such that at least one end of the bracket is configured to abut an interior surface of the aircraft pylon.

15. A method for securing a store connector for a store to an aircraft, the aircraft comprising a pylon, the pylon having an opening through which the store connector may be released from the store and having a bail bar located within the pylon, the method comprising:
   hanging the store connector from a point of support, the point of support overlying the opening;
   supporting the point of support at least in part by coupling the point of support to the bail bar via a bracket, the point of support being offset from the bail bar; and
   coupling the store to the store connector.

16. The method of claim 15, wherein the point of support is generally aligned with a central axis of the opening.

17. The method of claim 15, further comprising supporting the point of support at least in part from an interior surface of the aircraft pylon.

18. The method of claim 15, further comprising electronically coupling the store to the aircraft.

19. The method of claim 15, wherein the store is releasably hung from the point of support such that the store may be selectively released from the aircraft.

20. The method of claim 15, further comprising coupling the store to the pylon such that the point of support does not carry the weight of the store prior to release of the store.

* * * * *